Patented Apr. 9, 1935

1,997,135

UNITED STATES PATENT OFFICE 1,997,135

CATALYST AND PROCESS OF PREPARING SAME

Edouard Robert William de Mahler, Nice, France

No Drawing. Application August 2, 1934, Serial No. 738,161. In Great Britain November 1, 1932

18 Claims. (Cl. 23—236)

This invention relates to improvements in the preparation and use of catalytic agents which are particularly suitable for the purpose of hydrogenation.

The employment of metals such as iron, nickel, or cobalt, in a finely divided state as catalytic agents is known; and it is also known that the catalytic activity of such metals depends to a great extent on the manner in which they are prepared. Thus the catalyst shows optimum activity in catalyzing only those processes which are conducted at a temperature not greatly differing from that at which the catalyst was itself prepared. For example, nickel obtained by reduction from its oxides with hydrogen at temperatures over 350° cent. has comparatively weak catalytic properties when applied to processes taking place say at 200° cent.; and when heated to a temperature of 750° nickel loses its catalytic properties altogether. Cobalt is reduced from its oxides in practice with hydrogen at temperatures over 400° cent. and the reduction of iron from its oxides with hydrogen requires a period of six to seven hours and a temperature of 400° to 450° cent., and it is found that the catalytic properties of the metals so prepared are comparatively poor, since the processes in which they are generally required are preferably conducted at much lower temperatures than these.

From this it can be deduced that the lower the temperature at which the metals are prepared, the higher will be their catalytic activity when applied to low temperature processes; and we provide an improved and economical method whereby the metals can be prepared at atmospheric temperatures to produce catalysts of extremely high activity.

In accordance with my invention the catalysts are formed by producing iron, nickel, or cobalt in the metallic condition from their salts, preferably the halogen salts, in a non-oxidizing organic liquid medium by means of a more electropositive metal such as magnesium or zinc. It is necessary for there to be sufficient ionization in the medium to permit the reaction to take place. The most effective way of ensuring this is to use the salt in hydrated condition. We term non-oxidizing organic liquid media those which do not lead to substantial oxidation of the precipitated metal during the making of the catalyst, such as ether, ethyl alcohol, methyl alcohol, benzene, or xylol. In general simple alcohols, ketones, aldehydes, ethers, and hydrocarbons can be employed as media with varying degrees of success.

Catalytic iron, for example, is made by dissolving hydrated ferric chloride in ether. The mixture is shaken and then allowed to stand some hours. The clear ethereal layer is then decanted off. Iron is deposited from this solution by addition of short strips of magnesium ribbon as free as possible from surface oxidation, and can be separated magnetically or otherwise and kept for use protected from oxygen. Generally it is found better to allow the mixture to stand for some 24 hours before separation of the precipitated catalytic metal.

Catalytic nickel is prepared as follows: Firstly crushed hydrated nickel bromide is added to ether. A certain amount of the nickel salt goes into solution in the ether but the remainder forms a separate lower semi-liquid layer or suspension. An equivalent quantity of powdered zinc is then added and the mixture is slightly warmed from time to time to maintain the reaction. When the latter ceases the mixture is allowed to stand and the metal is separated magnetically then washed in ether and kept for use protected from oxygen. Alternatively, hydrated nickel chloride can be added in similar manner to xylene. The mixture is warmed to the boiling point of the xylene during which process the nickel salt forms a lower liquid layer. Powdered zinc is then added and the reaction proceeds, the mixture being warmed as necessary to maintain the reaction. The metal is separated as in the previous example.

Catalytic cobalt can be prepared from hydrated cobaltous chloride in xylene as described above for nickel.

The iron, nickel, or cobalt catalyst produced according to the invention is particularly useful in most of the processes of hydrogenation in which nickel or iron prepared by reduction of the oxide has been employed. However, the range of application is probably more extended. Though I normally prefer to make my catalysts at substantially atmospheric temperature, I may make the catalyst at higher temperatures, still well below the hydrogen-reduction temperatures, especially when the hydrogenation or other process to be catalyzed is carried out at such higher temperatures.

I claim as my invention:

1. A catalyst comprising a metal of the group consisting of iron, nickel and cobalt, said catalyst being free of substantial amounts of metal oxides, and being obtained by depositing a metal of the group consisting of iron, nickel and cobalt from its salt in a neutral non-oxidizing organic liquid medium of the group consisting of ethers, alcohols, ketones, aldehydes and hydrocarbons by means of a more electro-positive metal.

2. A catalyst comprising a metal of the group consisting of iron, nickel and cobalt, said catalyst being obtained by depositing a metal of the group consisting of iron, nickel, and cobalt from its salt in a neutral non-oxidizing organic liquid medium of the group consisting of ethers, alcohols, ketones, aldehydes and hydrocarbons by means of a more electro-positive metal, and separating the deposited catalytic metal from the mixture.

3. A catalyst comprising metallic iron, said catalyst being free of substantial amounts of metal oxides, and being obtained by depositing iron from a solution of its salt in a neutral non-oxidizing organic liquid of the group consisting of ethers, alcohols, ketones and aldehydes by means of a more electro-positive metal.

4. A catalyst comprising a metal of the group consisting of iron, nickel and cobalt said catalyst being free of substantial amounts of metal oxides, and being obtained by depositing a metal of the group consisting of iron, nickel and cobalt from a solution of its salt in alcohol by means of a more electro-positive metal.

5. The process of forming a catalyst which comprises depositing a metal of the group consisting of iron, nickel and cobalt from its salt in a neutral non-oxidizing organic liquid medum of the group consisting of ethers, alcohols, ketones, aldehydes and hydrocarbons by means of a more electro-positive metal.

6. The process of forming a catalyst which comprises depositing a metal of the group consisting of iron, nickel and cobalt from its salt in a neutral non-oxidizing organic liquid medium of the group consisting of ethers, alcohols, ketones, aldehydes and hydrocarbons by means of a more electro-positive metal and separating the deposited metal from the mixture.

7. The process of forming a catalyst which comprises dissolving one of the hydrated salts of a metal from the group consisting of iron, nickel and cobalt in a neutral non-oxidizing organic liquid of the group consisting of ethers, alcohols, ketones, aldehydes and hydrocarbons, and depositing the metal therefrom by means of a more electro-positive metal.

8. The process of forming a catalyst which comprises depositing at atmospheric temperature a metal of the group consisting of iron, nickel and cobalt from its salt in a neutral non-oxidizing organic liquid medium of the group consisting of ethers, alcohols, ketones, aldehydes and hydrocarbons by means of a more electro-positive metal.

9. The process of forming a catalyst which comprises depositing metallic iron, from a solution of its salt in ether by means of a more electro-positive metal.

10. The process of forming a catalyst which comprises depositing a metal of the group consisting of iron, nickel, and cobalt from a suspension of its hydrated salt in a liquid hydrocarbon by means of a metal which is more electro-positive than the metal of the aforementioned group.

11. The process of forming a catalyst which comprises depositing a metal of the group consisting of iron, nickel and cobalt from a solution of its salt in alcohol by means of a metal which is more electro-positive than the metal of the aforementioned group.

12. The process of forming a catalyst which comprises depositing catalytic metallic iron from a solution of ferric chloride in ether by means of magnesium.

13. The process of forming a catalyst which comprising depositing catalytic metal of the group consisting of nickel and cobalt from a suspension of its hydrated chloride in which the metal is bivalent in xylol by means of zinc.

14. A catalyst comprising metallic iron, obtained by depositing catalytic iron from a solution of ferric chloride in ether by means of magnesium.

15. The process of forming a catalyst which comprises depositing metallic nickel from a suspension of its salt in a neutral non-oxidizing organic liquid of the group consisting of ether and xylene by means of a more electro-positive metal.

16. The process of producing a catalyst which comprises forming a liquid layer from a hydrated salt of a metal of the group consisting of iron, nickel and cobalt beneath a layer of neutral non-oxidizing organic liquid, in which the salt is insoluble or soluble with difficulty, of the group consisting of ethers and hydrocarbons, and depositing the metal by means of a more electro-positive metal.

17. A catalyst comprising a metal of the group consisting of iron, nickel, and cobalt, obtained by depositing the catalytic metal by means of a more electro-positive metal from a hydrated salt of the metal formed as a liquid layer beneath a layer of neutral non-oxidizing organic liquid, in which the salt is insoluble or soluble with difficulty, of the group consisting of ethers and hydrocarbons.

18. A catalyst comprising a metal of the group consisting of nickel and cobalt obtained by depositing the catalytic metal from a suspension of its hydrated chloride in which the metal is bivalent in xylol by means of zinc.

EDOUARD ROBERT WILLIAM DE MAHLER.

CERTIFICATE OF CORRECTION.

Patent No. 1,997,135. April 9, 1935.

EDOUARD ROBERT WILLIAM de MAHLER.

It is hereby certified that error appears in the printed specification of the above numbered patent requiring correction as follows: Page 1, before line 1, insert the following paragraph: This is a continuation in part of my application 697,229, filed November 8, 1933.; and that the said Letters Patent should be read with this correction therein that the same may conform to the record of the case in the Patent Office.

Signed and sealed this 27th day of August, A. D. 1935.

(Seal)

Leslie Frazer
Acting Commissioner of Patents.